United States Patent
Qin et al.

(10) Patent No.: US 10,948,617 B2
(45) Date of Patent: Mar. 16, 2021

(54) GENERATING A VELOCITY MODEL FOR A SUBSURFACE STRUCTURE USING REFRACTION TRAVEL TIME TOMOGRAPHY

(71) Applicant: Saudi Arabian Oil Company, Dhahran (SA)

(72) Inventors: Fuhao Qin, Dhahran (SA); Constantinos Tsingas, Dhahran (SA); Tong Wang Fei, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 459 days.

(21) Appl. No.: 15/837,408

(22) Filed: Dec. 11, 2017

(65) Prior Publication Data
US 2019/0179043 A1 Jun. 13, 2019

(51) Int. Cl.
| G01V 1/28 | (2006.01) |
| G01V 1/30 | (2006.01) |
| G01V 1/36 | (2006.01) |

(52) U.S. Cl.
CPC ............... *G01V 1/282* (2013.01); *G01V 1/30* (2013.01); *G01V 1/305* (2013.01); *G01V 1/36* (2013.01); *G01V 1/362* (2013.01); *G01V 1/301* (2013.01); *G01V 1/302* (2013.01); *G01V 2210/48* (2013.01); *G01V 2210/6222* (2013.01)

(58) Field of Classification Search
CPC .......... G01V 1/282; G01V 1/30; G01V 1/305; G01V 2210/48; G01V 2210/6222; G01V 1/301; G01V 1/302; G01V 1/36; G01V 1/362

See application file for complete search history.

(56) References Cited

U.S. PATENT DOCUMENTS

| 9,470,811 B2 | 10/2016 | Sun et al. |
| 2011/0090760 A1 | 4/2011 | Rickett et al. |

(Continued)

FOREIGN PATENT DOCUMENTS

WO 2005026776 3/2005

OTHER PUBLICATIONS

International Search Report and Written Opinion issued in International Application No. PCT/US2018/062451 dated Mar. 6, 2019, 15 pages.

(Continued)

*Primary Examiner* — Roy Y Yi
*Assistant Examiner* — Geoffrey T Evans
(74) *Attorney, Agent, or Firm* — Fish & Richardson P.C.

(57) ABSTRACT

The present disclosure describes methods and systems, including computer-implemented methods, computer program products, and computer systems, for generating a velocity model for a subsurface structure. One computer-implemented method for determining velocity model for a subsurface structure includes generating, by at least one hardware processor, a first velocity model for the subsurface structure by performing a refraction traveltime tomography procedure based on an initial velocity model; and generating, by the at least one hardware processor, a first refined velocity model based on the first velocity model and a structure skeleton model, wherein the structure skeleton model is determined based on reflection seismic data of the subsurface structure.

17 Claims, 6 Drawing Sheets

(56) References Cited

U.S. PATENT DOCUMENTS

| | | | |
|---|---|---|---|
| 2012/0218861 A1* | 8/2012 | Xia | G01V 1/282 367/73 |
| 2013/0311149 A1 | 11/2013 | Tang et al. | |
| 2014/0200816 A1 | 7/2014 | Peng et al. | |
| 2015/0168574 A1* | 6/2015 | Wallet | G01V 1/368 367/53 |
| 2016/0131781 A1 | 5/2016 | Sun et al. | |
| 2016/0209534 A1 | 7/2016 | Behura | |

OTHER PUBLICATIONS

Birdus et al., "Successful application of joint reflection/refraction tomographic inversion in a shallow water marine environment," 23$^{rd}$ International Geophysical Conference and Exhibition, Aug. 11-14, 2013, 4 pages.

Cai et al., "Three-dimensional refraction imagining," 64$^{th}$ Annual International Meeting, SEG, Oct. 23-28, 1994, 4 pages.

Golikov et al., "Building near-surface models with velocity inversions and evaluating their impact on depth imaging," SEG Denver 2014 Annual Meeting, Oct. 26-31, 2014, 5 pages.

Hayashi et al., "Non-Uniqueness in Seismic Refraction Analysis," Symposium on the application of geophysics to Engineering and environmental problems, Apr. 10-14, 2011, 13 pages.

Nemeth et al., "Dynamic smoothing in cross-well tomography," 63$^{rd}$ Annual International Meeting, SEG, Sep. 26-30, 1993, 4 pages.

Qin et al., "Finite difference solution of the eikonal equation along expanding wavefronts," Geophysics, Mar. 1992, 10 pages.

Qin et al., "Inversion and imagining of refraction data," 63$^{rd}$ Annual International Meeting, SEG, Sep. 26-30, 1993, 3 pages.

Schuster et al., "Wavepath eikonal traveltime inversion: Theory," Geophysics, Sep. 1993, 10 pages.

Vidale, "Finite-difference traveltime calculation," Bulletin of the Seismological Society of America, Dec. 1988, 15 pages.

Woodward, "Wave-equation tomography," Geophysics, Jan. 1992, 12 pages.

Zhang et al., "Nonlinear refraction traveltime tomography," Geophysics, Sep.-Oct. 1998, 12 pages.

Zhu et al., "Estimation of near-surface velocities by tomography," SEG 58$^{th}$ Annual International Meeting, Oct. 30-Nov. 3, 1988, 3 pages.

GCC Examination Report in GCC Appln. No. GC 2018-36610, dated Feb. 19, 2020, 4 pages.

GCC Examination Report in GCC Appln. No. GC 2018-36610, dated Jun. 3, 2020, 4 pages.

* cited by examiner

GENERATING A VELOCITY MODEL FOR A SUBSURFACE STRUCTURE USING REFRACTION TRAVEL TIME TOMOGRAPHY

TECHNICAL FIELD

This disclosure relates to exploration and production of hydrocarbons, and more specifically, to generating a velocity model for a subsurface structure using refraction traveltime tomography (RT).

BACKGROUND

In a geophysics analysis, a velocity model is an important factor in understanding the subsurface structure of a region. In a subsurface region, sedimentary rock forms through deposition over time. Layers of rock are created from different materials under varying conditions. Therefore, each layer of rock has different properties. A velocity model maps out the layers of rock in a monitoring region and the expected speed seismic waves travel in each layer. A velocity model can be used to interpret seismic signals observed in the monitoring region and to generate images of the subsurface area. Therefore, a good velocity model can provide better understanding of the subsurface structure and improve the efficiency of a hydrocarbon exploration or production operation in the geographic area.

SUMMARY

The present disclosure describes methods and systems, including computer-implemented methods, computer program products, and computer systems for generating a velocity model. One computer-implemented method for determining velocity model for a subsurface structure includes generating, by at least one hardware processor, a first velocity model for the subsurface structure by performing a refraction traveltime tomography procedure based on an initial velocity model; and generating, by the at least one hardware processor, a first refined velocity model based on the first velocity model and a structure skeleton model, wherein the structure skeleton model is determined based on reflection seismic data of the subsurface structure.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, cause the system to perform the actions. One or more computer programs can be configured to perform particular operations or actions by virtue of including instructions that, when executed by data processing apparatus, cause the apparatus to perform the actions.

The details of one or more implementations of the subject matter of this specification are set forth in the accompanying drawings and the subsequent description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following description is presented to enable any person skilled in the art to make and use the disclosed subject matter, and is provided in the context of one or more particular implementations. Various modifications to the disclosed implementations will be readily apparent to those skilled in the art, and the general principles defined in this disclosure may be applied to other implementations and applications without departing from scope of the disclosure. Thus, the present disclosure is not intended to be limited to the described or illustrated implementations, but is to be accorded the widest scope consistent with the principles and features described in this disclosure.

This disclosure generally describes methods and systems, including computer-implemented methods, computer program products, and computer systems, for generating a velocity model.

In some cases, seismic signals can be transmitted by a source device. The source device can transmit the seismic signals into the subsurface of the earth at a source location. Examples of the seismic signals include acoustic signals. The seismic signals travel through the subsurface and can be received by a receiver device placed at a receiver location. In some cases, the source device, the receiver device, or a combination thereof can be placed at the surface. The signals can propagate downwards until they reach a reflecting structure and reflect upwards, towards the surface. Because the signals have refracted and reflected through the sub-structure, the characteristics of the received signals contain information of the substructure. The received signals can be analyzed to produce images of the subsurface structure.

In a marine survey, air guns and hydrophones can be used as the source devices and the receiver devices, respectively. During the acquisition, seismic signals are exploded from arrays of air guns. The reflected and refracted signals are acquired by streamers of hydrophones. In a land acquisition, dynamite can be used as an explosive source and a geophone is employed as a receiver device. In another example, vibratory trucks can be used as source devices. Other devices that generate and receive seismic signals can also be used.

In the context of oil and gas industry, refraction traveltime tomography (RT) can be used to develop a velocity model of a subsurface structure based on the seismic signals. In particular, during the RT procedure, the differences of the observed seismic arrival time and the calculated traveltime are minimized to find the suitable velocity model. The following equation describes an objective function for minimizing the traveltime:

$$\varepsilon = \frac{1}{2}\sum_i (t_i^{obs} - t_i^{cal}(m))^2 \quad (1)$$

where, $\varepsilon$ represents the objective function to be minimized, i represents the i-th shot (source) and receiver pair, and $t_i$ represents the traveltime for the seismic signal for the i-th pair of source and receiver device, superscript obs refers to traveltime obtained based on observation data, and cal refers to traveltime calculated based on a particular velocity model m. The objective function can also be referred to as traveltime misfit function. In some implementations, a gradient-based simultaneous iterative reconstruction technique (SIRT) can be used to refine the velocity model. In some cases, the subsurface structure of the area between the source device and the receiver device can be partitioned into multiple cells. Each cell can be a cube or a rectangular prism. A velocity model in the subsurface structure can be represented by a plurality of velocity values, each velocity value corresponding to a respective cell. The following equation describes the calculation of gradient of the $j_{th}$ cell, denoted as $g_j$:

$$g_j = -\frac{\sum_i \Delta t_i}{N_j} \quad (2)$$

where $N_j$ represents the number of rays that visit the jth cell, and $\Delta t_i = (t_i^{obs} - t_i^{cal})$ represents the difference of the observed traveltime and calculated traveltime for the i-th source-receiver pair. The traveltime is summed over all the rays that visit the $j_{th}$ cell. In the subsurface structure, a ray of a seismic signal follows the wavepath of the signal. Therefore, a rayptah can also be referred to as a wavepath. The thickness of the wavepath is proportional to the inverse of frequency and the wavepath length. For a simplified calculation, the thickness of the wavepath can be treated as a constant value throughout the wavepath. The diameter of the wavepath, sometimes referred to as the diameter of the wavepath tube, can be calculated as $A\sqrt{L}$, where L represents the wavepath length and A represents a predetermined constant. L can be approximated by the distance between the source and receiver devices. This approach may lead to a faster convergence during the initial iterations.

Refraction rays are not evenly distributed throughout the subsurface structure. A cell may not have any rays that pass through the cell. In those cases, the gradient field can be extrapolated in a downward direction. In other words, the cell that does not have any rays passing through can use the same gradient value as the cell immediately above it. The downward extrapolation of the gradient can provide each layer with a similar updating direction. This approach may mitigate convergence issues for the RT procedure.

In some implementations, a finite difference solution can be used to calculate the traveltime map for a source device. The raypaths can be found by back-tracking against the gradient direction of the traveltime field from the receiver devices. The following equation describes the calculation of the direction of the ray, represented as the derivatives of the traveltime field, denoted as D:

$$D = \left(-\frac{\partial T(x, z)}{\partial x}, -\frac{\partial T(x, z)}{\partial z}\right) \quad (3)$$

where T(x, z) is the traveltime field for the source location, x represents the horizontal distance, and z represents depth. The negative sign indicates that the direction of the raypath is to opposite to the direction of the wave propagation.

In some implementations, a smoothing filter, for example a rectangular smoothing filter, can be used to filter the gradient field. The size of the smoothing filter can take an initial value in the first several iterations. The initial value can be reduced as the number of iterations increases.

In some cases, RT may have a non-unique solution problem, which means that the velocity model may not converge over multiple iterations. The problem may be caused by noises in the observed data, the concentration of raypaths on narrow bands along high velocity zones, or a combination thereof. These issues may also cause the RT to arrive at a model that does not approximate the true model in the subsurface structure.

In some implementations, an RT assisted by reflection (RTAR) procedure can be used to improve the RT procedure. In an RTAR procedure, a RT model is generated using the RT procedure discussed previously. The RT model is further refined using a structure skeleton model that is generated based on reflection seismic data. The refined RT model is used in the next iteration of the RT procedure as an initial model. This process can be repeated until the refined RT model does not change further. FIGS. 1-6 and associated descriptions provide additional details of these implementations.

Figure 1:
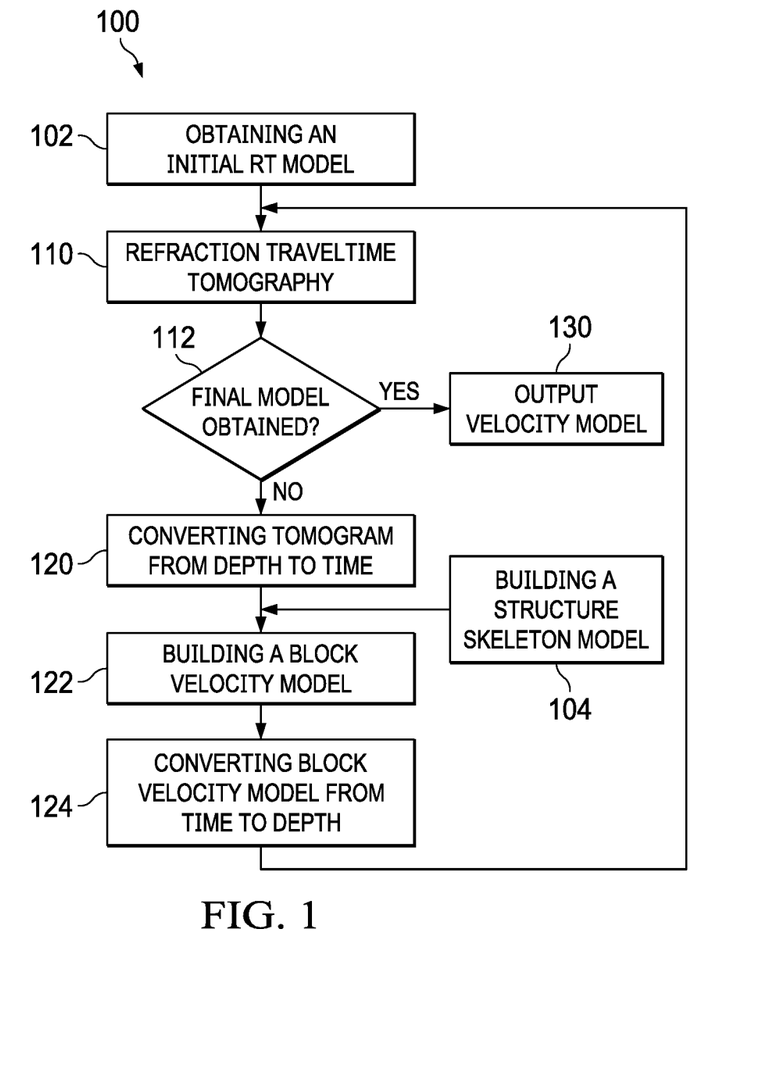
FIG. 1 illustrates an example method of the refraction traveltime tomography assisted by reflection (RTAR) procedure, according to an implementation.

FIG. 1 illustrates an example method 100 of the RTAR procedure, according to an implementation. For clarity of presentation, the description that follows generally describes method 100 in the context of FIGS. 2-5. However, it will be understood that method 100 may be performed, for example, by any other suitable system, environment, software, and hardware, or a combination of systems, environments, software, and hardware, as appropriate. In some cases, the method 100 can be executed on large scale computer clusters, super computers, or any other computing device or collection of computing devices. In some implementations, various steps of method 100 can be run in parallel, in combination, in loops, or in any order.

The method 100 begins at 102, where an initial RT model is obtained. In one implementation, the initial RT model can be obtained by using a homogenous velocity model as a starting point, and using the RT procedure based on minimizing the differences between the calculated traveltime and observed traveltime as described previously, for example, in equations (1) to (3) and associated descriptions.

Figure 2:
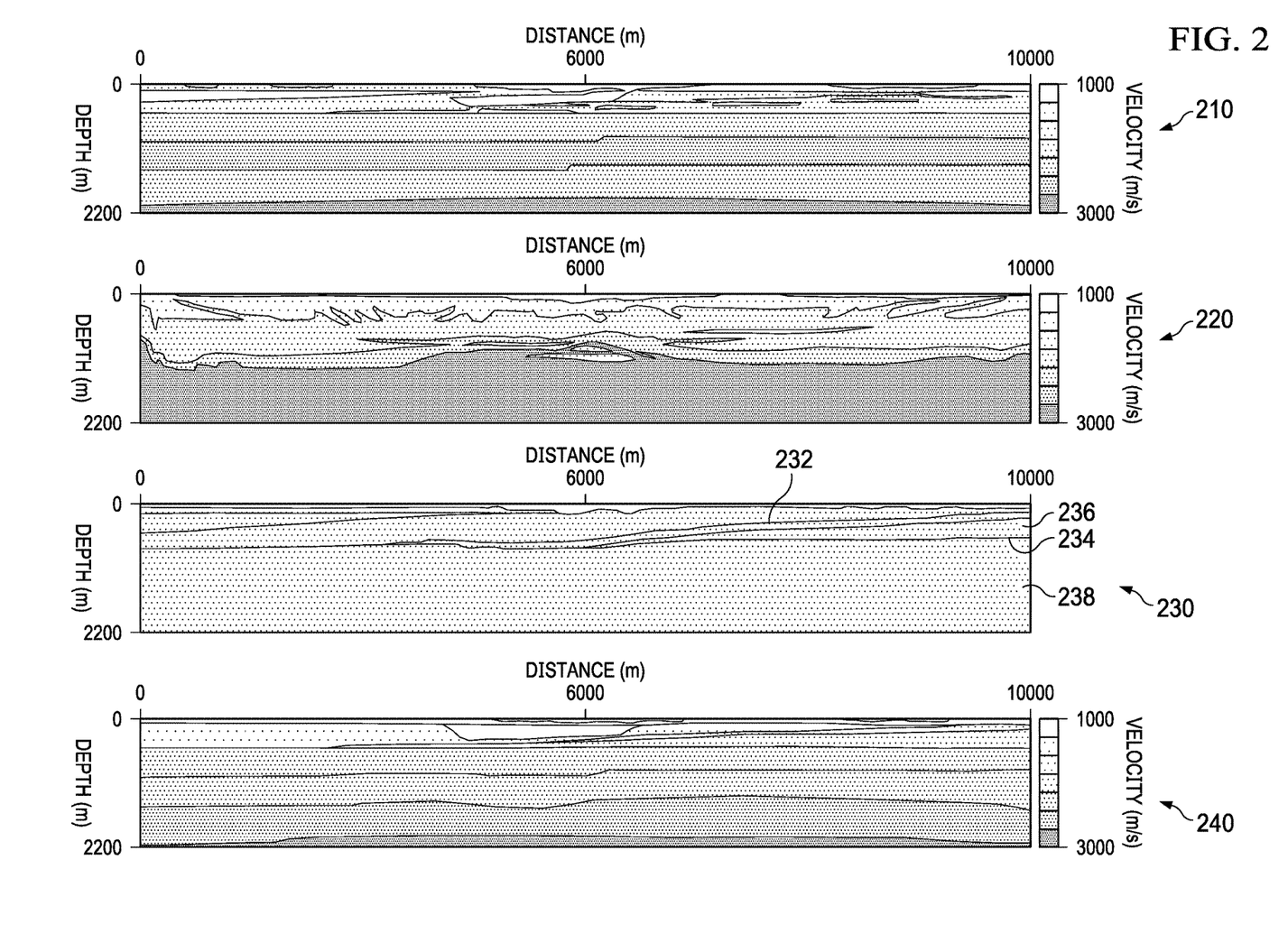
FIG. 2 illustrates different models used in an example RTAR procedure, according to an implementation.

FIG. 2 illustrates different models used in an example RTAR procedure, according to an implementation. FIG. 2 includes a graph 210 that represents a 2-Dimensional (2D) synthetic velocity model. The y-axis represents the depth of the subsurface structure, ranging from 0 to 2300 meter (m). The x-axis represents horizontal length of the subsurface structure, ranging from 0 to 10000 m. The velocity value of each location in the subsurface structure at a particular depth and horizontal distance is represented by the level of the gray shade of that location in the graph. The velocity value ranges from about 1000 meter/second (m/s), represented by the light gray shade, to 3500 m/s, represented by the dark gray shade. Source devices are evenly spaced at the surface with a spacing of 100 m and the receivers are spread along the surface with a spacing of 20 m. Simulation models, for example, Finite difference eikonal equation solver, can be used to generate travel times and collected as observed data.

FIG. 2 includes a graph 220 representing the initial RT model. In the illustrated example, a homogenous velocity model with a velocity value of 1000 m/s and grid size of 10 m throughout the subsurface structure is used as a starting point. The initial RT model is obtained after 60 iterations of the RT procedure, where the initial RT model stabilizes after about 25 iterations. As illustrated, the top 50 meters of the initial RT model resemble the corresponding portion of the synthetic model shown in the graph 210, indicating that the RT procedure can approximate successfully in the shallow low velocity zone. However, the rest of the initial RT model is significantly different from the synthetic model, indicating that the RT procedure fails to approximate the deep part of the subsurface structure. Accordingly, the initial RT model is a local minimum model that does not provide solution to the deep part of the subsurface structure.

Returning to FIG. 1, at 104, a structure skeleton model is built based on seismic data. The seismic data are collected in seismic surveys. During a seismic acquisition, a source (dynamite, vibratory truck, air gun array) is activated and the reflections/refractions/transmissions from the subsurface geological boundaries are recorded by the receiver devices which are located on the surface of the Earth. This type of acquisition is repeated for each shot, sequentially or simultaneously, until all the seismic data have been acquired for this survey area. In some cases, the acquired seismic data are collected in the field, transferred to an office (stored and transported via a computer network, a physical network, or a combination thereof), and used as inputs to a computing device executing the method 100.

The structure skeleton model represents the division of the geological settings of the subsurface structure that is obtained based on analyzing the reflection events that are captured in the seismic data. In some implementations, seismic interpretation software can be used for the time domain subsurface structure extraction. For seismic data that has a high signal to noise ratio, seismic data of the smallest source and receiver distance can be used as input to the seismic interpretation software to extract the time domain subsurface structure. For seismic data that has a low signal to noise ratio, a stack of the near offset seismic data can be used additionally as inputs. The extracted subsurface structure can be used to divide the subsurface into blocks to obtain the structure skeleton model.

Referring to FIG. 2, FIG. 2 includes a graph 230 that represents the structure skeleton model obtained based on reflection analysis of the seismic data. The graph 230 includes reflection lines 232 and 234. The reflection lines, for example the lines 232 and 234, represent the area in the underground geological structure where the reflection events take place, which correspond to the interfaces between rock types in the subsurface structure. Therefore, the lines 232 and 234 indicate the location where the geological settings change. Because seismic velocity is closely related to rock types, the velocity values can be similar within each geological setting and change where the geological setting changes. Therefore, we can use the reflection events to divide the initial RT model into different geological regions, for example, regions 236 and 238 as shown in the graph 230. Each region can include one or more cells discussed previously.

Returning to FIG. 1, the method 100 proceeds from 102 to 110, where RT procedure is performed. At the first iteration, because the initial RT model has been obtained using the RT procedure, the method 100 can proceed directly to 112. At 112, whether the final model is obtained at the current iteration is determined by the computer performing the method 100. At the first iteration, the method 100 can proceed directly to 120.

At 120 the RT model is converted from depth domain to time domain. The structure skeleton model is a time domain model. Therefore, to use the structure skeleton model in RTAR, depth domain to time domain conversion is used. In some cases, a two way traveltime calculation that uses the RT model as the velocity model for each vertical grid can be used to perform the depth-to-time domain conversion.

At 122, a time domain block velocity model is built based on the initial RT model and the structure skeleton model. As discussed previously, the velocity in each region in the substructure, as divided based on the structure skeleton model, can be similar. Therefore, for each region in the structure skeleton model, the velocity of the initial RT model is averaged to obtain the block velocity model. For example, if a region includes multiple cells, the velocity values corresponding to these multiple cells are averaged, and the averaged velocity value replaces the original velocity values for these multiple cells.

At 124, the block velocity model is converted back to the depth domain. In some cases, a one dimensional depth calculation that uses the block velocity model as the velocity model for each vertical grid can be used to perform the time-to-depth domain conversion. The converted block velocity model replaces the initial RT model obtained at 102, and is used as the new initial RT model for the RT procedure at 110. The new initial RT model combines the geological structure information obtained from the reflection seismic data and the refraction traveltime information obtained from the RT procedure, and therefore provides a better starting point to coverage to a model that is closer to the true velocity.

At 112, whether the final model is obtained is determined. Each iteration of the steps 110 to 124 can be referred to as an RTAR iteration. In some implementations, whether the final model is obtained can be determined by comparing the output of the RT procedure at different RTAR iterations. For example, at the second RTAR iteration, a second RT model is produced at 110, and the second RT model can be compared with the initial RT model and determine whether the modeling process continues to approach the correct velocity model. In some cases, prior information, such as known geology features and well logs, can be used. If, comparing to the initial RT model, the second RT model approximate closer to the prior information, then the modeling process continues to approach the correct velocity model. In these cases, the method 100 proceeds to 120-124 to complete the second RTAR iteration, where a second block velocity model is obtained based on the structure skeleton model, and used as the new initial RT model for the third RTAR iteration. If, comparing to the initial RT model, the second RT model does not approximate closer to the prior information, then the iterations stop and the method 100 proceeds to 130, where the second RT model is outputted as the final velocity model.

Referring to FIG. 2, FIG. 2 includes a graph 240 that represents the final RT model outputted by the method 100.

As illustrated, the final RT model is much closer to the true model shown in the graph 210 than the initial RT model shown in the graph 220. The improvement of the tomogram comes from two aspects. First, averaging of velocity inside a geological region reduces the degrees of freedom of the velocity values in each region. As such, the geological constraint introduced by the structure skeleton model reduces the uncertainty of the tomography. Second, refraction raypaths are led to the interfaces defined by the reflection information. But because they concentrate on the top of high velocity zones, they do not reflect details in low velocity zones. Introducing the reflection information captured in the seismic data helps to resolve this issue.

In some cases, the process can be sped up by modifying the gradient calculation in the RT procedure in the step 110. For example, instead of equation (2) discussed previously, the following equation can be used to calculate the gradient $g_j$:

$$g_j = -\frac{\sum_i \Delta t_i w_{ij}}{N_j} \quad (4)$$

where $w_{ij}$ is a weighting factor for the $j_{th}$ cell on the path of the $i_{th}$ ray, $N_j$ represents the number of rays that visit the jth cell, and $\Delta t_i = (t_i^{obs} - t_i^{cal})$ represents the difference of the observed traveltime and calculated traveltime for the i-th source-receiver pair. The weighting factor is defined by the following equations:

$$w_{ij} = \begin{cases} w_0 + |\sin(\alpha_{ij})| & \Delta t_i > 0 \\ w_0 + |\cos(\alpha_{ij})| & \Delta t_i < 0 \end{cases} \quad (5)$$

where $w_0$ is a base weighting factor and $\alpha_{ij}$ is the angle between the vertical direction and the segment of the $i_{th}$ ray in the $j_{th}$ cell. For the first arrival rays that travel along more vertically in slow velocity region and more horizontally in the high velocity zones, the weighting factor can give a greater weighting to the vertical ray segment. Therefore, the model can reflect more information for the low velocity region. In some cases, $w_0$ can be selected based on a balancing consideration of convergence speed and stability. In some cases, $w_0$ can be set to 1. $w_0$ can also set to be less than 1, which can increase the convergence speed; $w_0$ can also set to be greater than 1, can produce a more stable result.

Figure 3:
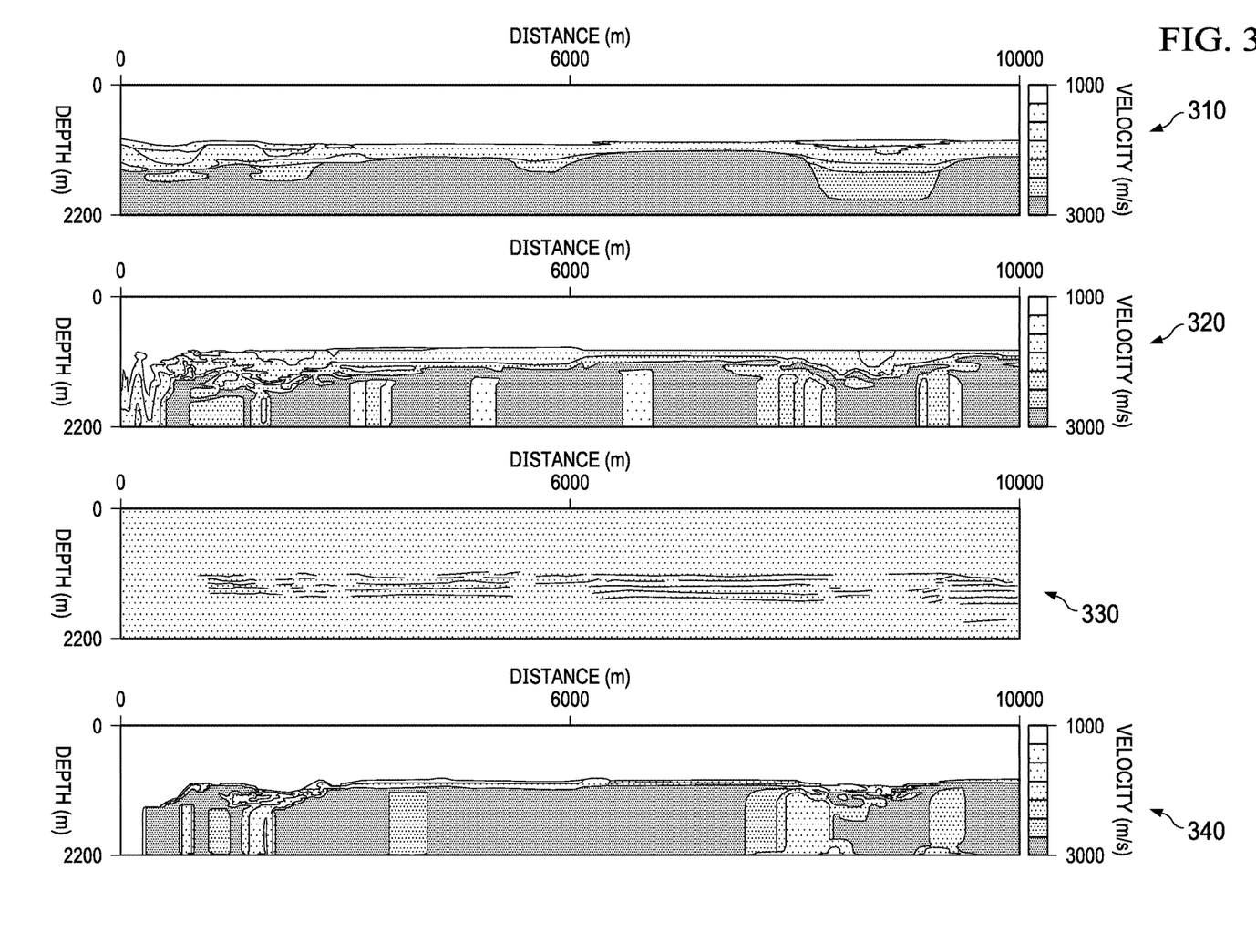
FIG. 3 illustrates different models used in another example RTAR procedure, according to an implementation.

FIG. 3 illustrates different models used in another example RTAR procedure, according to an implementation. Marine seismic data from a particular geological location is used. The subsurface area of the particular geological location is geologically complex, including salt bodies, carbonates, and clastic deposits. The velocity can vary from near water velocity (at some locations near the sea bottom) to high velocities of salt and carbonate (at other locations). FIG. 3 includes a graph 310 that represents a velocity model obtained using migration velocity analysis (MVA). Actual drilling operations indicate that this model is not accurate, due to MVA's difficulty in resolving near surface velocities.

FIG. 3 includes a graph 320 that represents the RT model obtained using the conventional RT procedure. 2D representations are extracted from the 3-Dimensional (3D) seismic data collected in a marine seismic survey. The source device spacing is 60 m and the receiver spacing is 10 m. The horizontal distances range from 200 m to 8000 m. First arrival traveltime has picking errors. The picking errors can be caused by the complexity of the data and the data interpolation artefacts.

In the RT procedure, the substructure is divided into cells with 10 m grid spacing in both vertical and horizontal direction. The velocity that is immediately above the water bottom is assumed at the water velocity of 1545 m/s. As illustrated, the RT model agrees with the MVA model in general, with a greater vertical resolution and a shallower high velocity zone at the top. However, the depth of the top high velocity zone, indicating salt body, is deeper than the well log indicates.

FIG. 3 includes a graph 330 and a graph 340. The graph 330 represents the structure skeleton model obtained based on seismic data. The graph 340 that represents the final velocity model obtained by the RTAR procedure discussed previously. 10 RTAR iterations are used to obtain the tomogram shown in the graph 340. As illustrated, the shallow low velocity layer is much thinner and its velocity is much lower compared to the MVA model shown in the graph 310 and the RT model shown in the graph 320.

Figure 4:
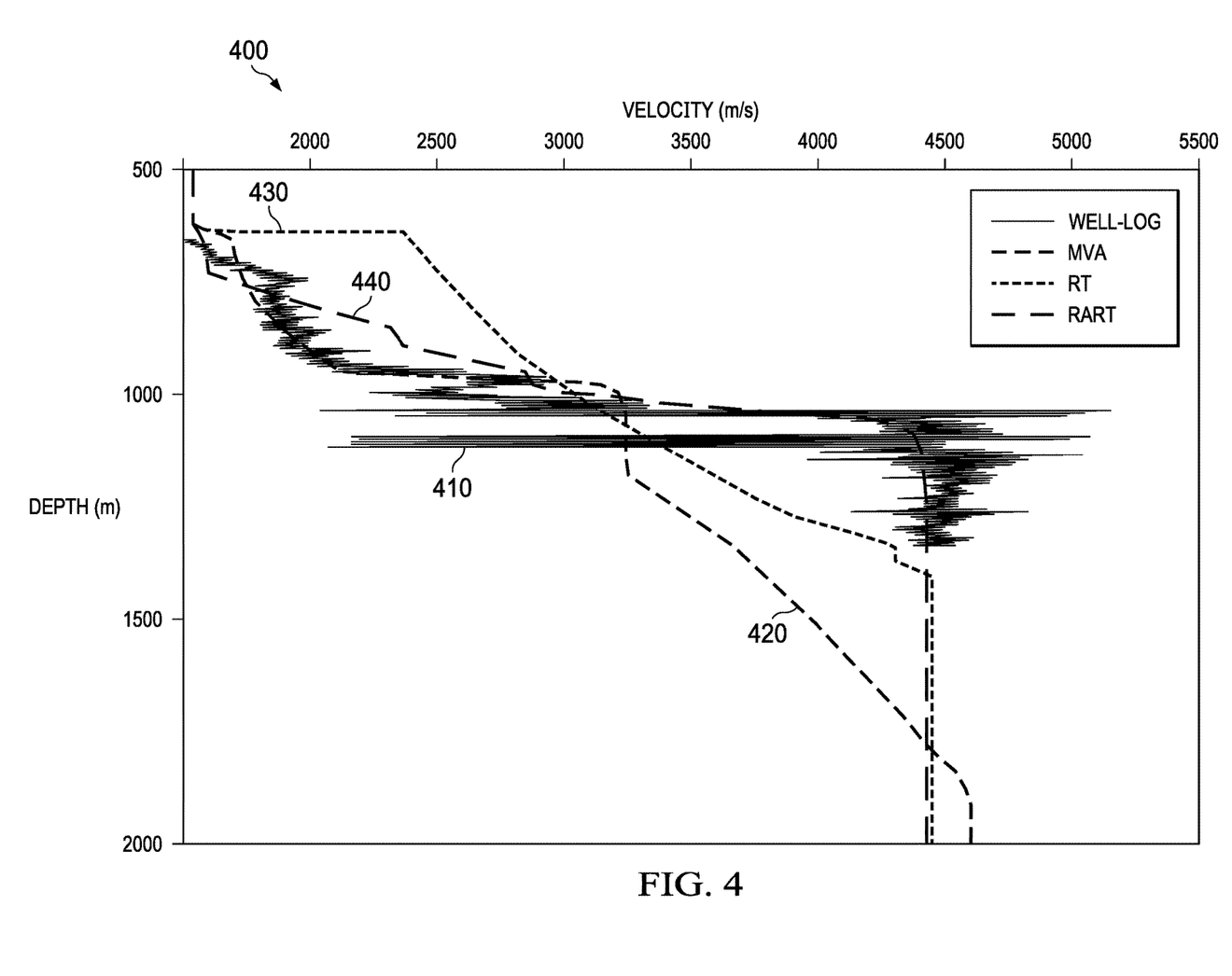
FIG. 4 is a chart 400 illustrating a comparison of different velocity models, according to an implementation.

FIG. 4 is a chart 400 illustrating a comparison of different velocity models, according to an implementation. The chart 400 includes curves 410, 420, 430, and 440. The curve 410 represents the velocity model obtained based on sonic log. The curve 420 represents the MVA model. The curve 430 represents the conventional RT model. The curve 440 represents the RTAR model. As illustrated, comparing to the MVA model and the conventional RT model, the RTAR model provides a much better matching to the model obtained by the sonic log.

Figure 5:
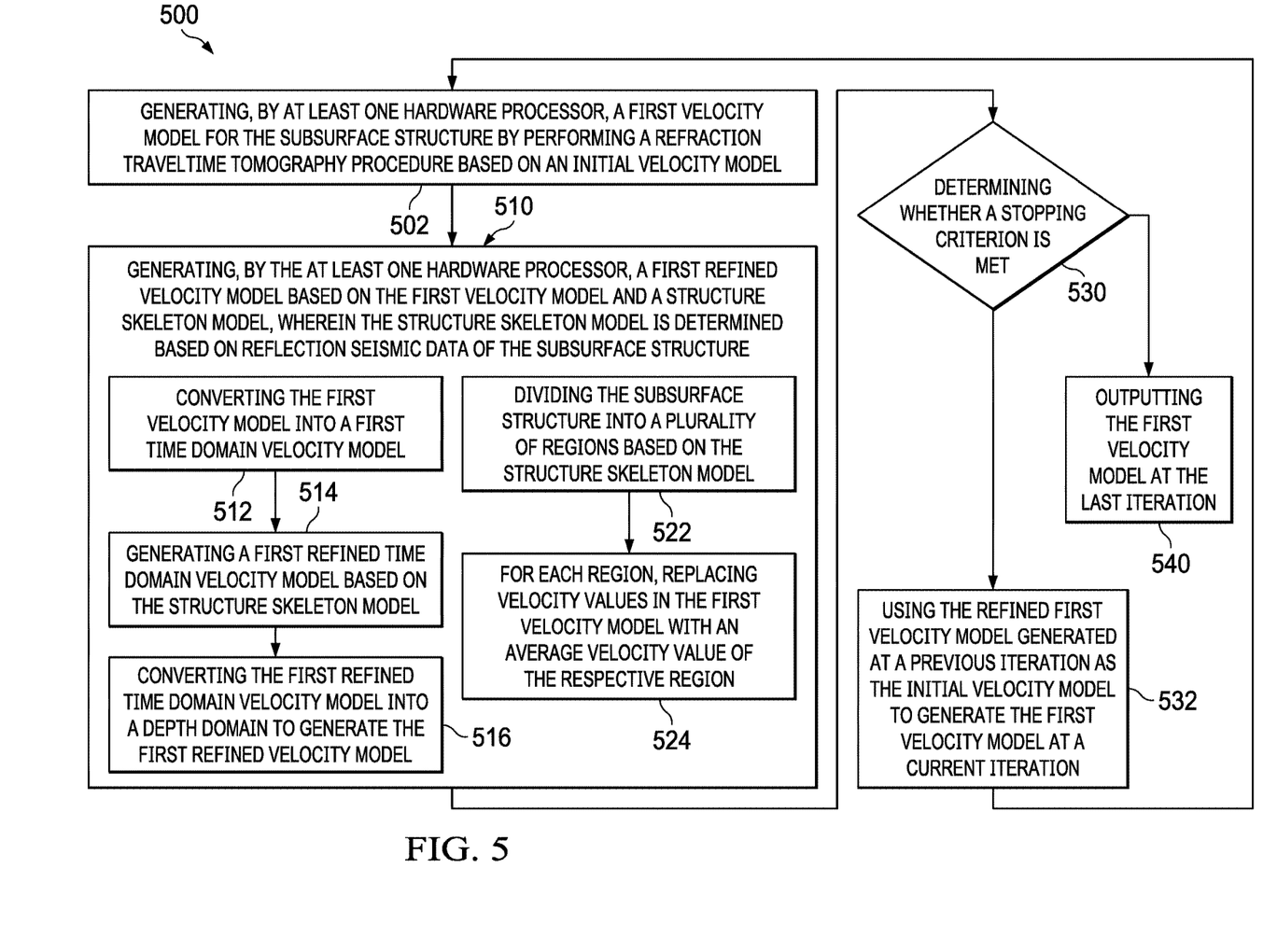
FIG. 5 illustrates an example velocity model determination method, according to an implementation.

FIG. 5 illustrates an example velocity determination method 500, according to an implementation. For clarity of presentation, the description that follows generally describes method 500 in the context of FIGS. 1-4 and 6. However, it will be understood that method 500 may be performed, for example, by any other suitable system, environment, software, and hardware, or a combination of systems, environments, software, and hardware, as appropriate. In some cases, the method 500 can be executed on a large scale computer cluster, super computers, or any other computing device or collection of computing devices. In some implementations, various steps of method 500 can be run in parallel, in combination, in loops, or in any order.

At 502, a first velocity model for the subsurface structure is generated by at least one hardware processor. The at least one hardware processor generates the first velocity model by performing a refraction traveltime tomography procedure based on an initial velocity model.

At 510, a first refined velocity model is generated by the at least one hardware processor based on the first velocity model and a structure skeleton model, where the structure skeleton model is determined based on reflection seismic data of the subsurface structure.

In some implementations, the step 510 can include steps 512, 514, and 516. At 512, the first velocity model is converted into a first time domain velocity model. At 514, the first refined time domain velocity model is generated based on the structure skeleton model. At 516, the first refined time domain velocity model is converted into a depth domain to generate the first refined velocity model.

In some implementations, the step 510 can include steps 522 and 524. At 522, the subsurface structure is divided into a plurality of regions based on the structure skeleton model. At 524, for each region, velocity values in the first velocity model is replaced with an average velocity value of the respective region. In some cases, each of the steps 522-524 can be performed prior to, after, or as part of one of the steps 512-516.

At 530, the at least one hardware processor determines whether a stopping criterion. If the stopping criterion is not met, the method 500 proceeds from 530 to 532. At 532, the refined first velocity model generated at a previous iteration is used as the initial velocity model to generate the first velocity model at a current iteration, and the steps 502, 510, and 530 are repeated. If the stopping criterion is met, the method 500 proceeds from 530 to 540. At 540, the first velocity model at the last iteration is outputted. The outputted velocity model can be used in geological imaging process, for example the time domain imaging or the depth domain imaging process, for the subsurface structure.

Figure 6:
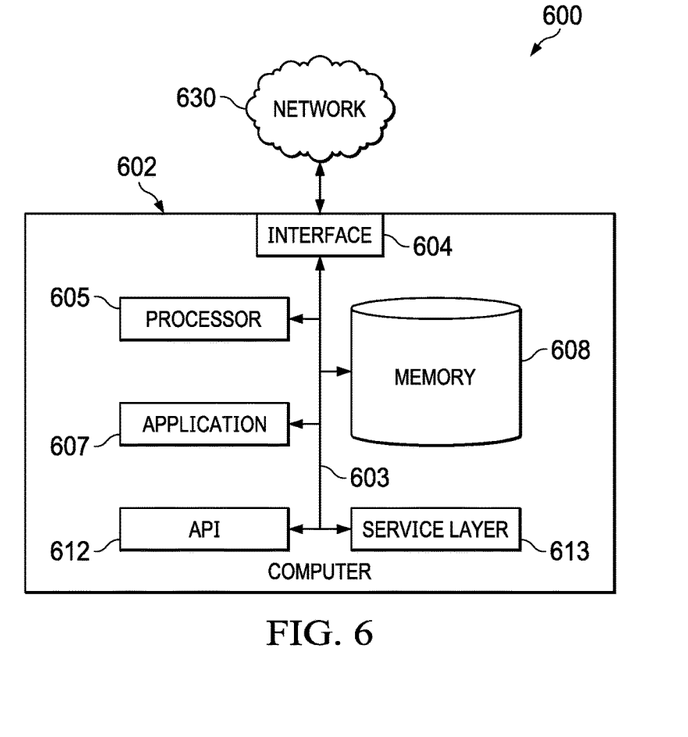
FIG. 6 is a high level architecture block diagram of a velocity model determination system, according to an implementation.

FIG. 6 is a high level architecture block diagram of a velocity model determination system 600 that determines a velocity model for a subsurface structure based on the methods described in this disclosure, according to an implementation. At a high level, the illustrated system 600 includes a computer 602 coupled with a network 630.

The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 630 facilitates communication between the computer 602 and other components, for example, components that obtain observed data for a location and transmit the observed data to the computer 602. The network 630 can be a wireless or a wireline network. The network 630 can also be a memory pipe, a hardware connection, or any internal or external communication paths between the components.

The computer 602 includes a computing system configured to perform the methods as described in this disclosure. For example, the computer 602 can be used to determine the velocity model as discussed previously. In some cases, the algorithm of the method can be implemented in an executable computing code, for example, C/C++ executable codes. In some cases, the computer 602 can include a standalone LINUX system that runs batch applications. In some cases, the computer 602 can include mobile or personal computers.

The computer 602 may comprise a computer that includes an input device, such as a keypad, keyboard, touch screen, microphone, speech recognition device, other devices that can accept user information, or an output device that conveys information associated with the operation of the computer 602, including digital data, visual or audio information, or a graphic user interface (GUI).

The computer 602 can serve as a client, network component, a server, a database, or other persistency, or any other component of the system 600. In some implementations, one or more components of the computer 602 may be configured to operate within a cloud-computing-based environment.

At a high level, the computer 602 is an electronic computing device operable to receive, transmit, process, store, or manage data and information associated with the system 600. According to some implementations, the computer 602 may also include or be communicably coupled with the following devices: an application server, e-mail server, web server, caching server, streaming data server, business intelligence (BI) server, or other server.

The computer 602 can receive requests over network 630 from a client application (for example, executing on another computer 602) and respond to the received requests by processing said requests in an appropriate software application. In addition, requests may also be sent to the computer 602 from internal users (for example, from a command console), external or third parties, or other automated applications.

Each of the components of the computer 602 can communicate using a system bus 603. In some implementations, any or all the components of the computer 602, both hardware or software, may interface with each other or the interface 604, over the system bus 603, using an application programming interface (API) 612 or a service layer 613. The API 612 may include specifications for routines, data structures, and object classes. The API 612 may be either computer language-independent or-dependent and refer to a complete interface, a single function, or even a set of APIs. The service layer 613 provides software services to the computer 602 or the system 600. The functionality of the computer 602 may be accessible for all service consumers using this service layer. Software services, such as those provided by the service layer 613, provide reusable, defined business functionalities, through a defined interface. For example, the interface may be software written in JAVA, C++, or suitable language providing data in Extensible Markup Language (XML) format. While illustrated as an integrated component of the computer 602, alternative implementations may illustrate the API 612 or the service layer 613 as stand-alone components in relation to other components of the computer 602 or the system 600. Moreover, any or all parts of the API 612 or the service layer 613 may be implemented as sub-modules of another software module, enterprise application, or hardware module, without departing from the scope of this disclosure.

The computer 602 includes an interface 604. Although illustrated as a single interface 604 in FIG. 6, two or more interfaces 604 may be used according to particular needs, desires, or particular implementations of the computer 602 or system 600. The interface 604 is used by the computer 602 for communicating with other systems in a distributed environment—including within the system 600—connected to the network 630 (whether illustrated or not). Generally, the interface 604 comprises logic encoded in software or hardware in a suitable combination and operable to communicate with the network 630. More specifically, the interface 604 may comprise software supporting one or more communication protocols associated with communications such that the network 630 or interface's hardware is operable to communicate physical signals within and outside of the illustrated system 600.

The computer 602 includes a processor 605. Although illustrated as a single processor 605 in FIG. 6, two or more processors may be used according to particular needs, desires, or particular implementations of the computer 602 or the system 600. Generally, the processor 605 executes instructions and manipulates data to perform the operations of the computer 602. Specifically, the processor 605 executes the functionality required for processing geophysical data.

The computer 602 also includes a memory 608 that holds data for the computer 602 or other components of the system 600. Although illustrated as a single memory 608 in FIG. 6, two or more memories may be used according to particular needs, desires, or particular implementations of the computer 602 or the system 600. While memory 608 is illustrated as an integral component of the computer 602, in alternative implementations, memory 608 can be external to the computer 602 or the system 600.

The application 607 is an algorithmic software engine providing functionality according to particular needs, desires, or particular implementations of the computer 602 or the system 600, particularly with respect to functionality required for processing geophysical data. For example, application 607 can serve as one or more components or applications described in FIGS. 1-5. Further, although illustrated as a single application 607, the application 607 may be implemented as multiple applications 607, on the computer 602. In addition, although illustrated as integral to the computer 602, in alternative implementations, the application 607 can be external to the computer 602 or the system 600.

There may be any number of computers 602 associated with, or external to, the system 600 and communicating over network 630. Further, the terms "client," "user," and other appropriate terminology may be used interchangeably, as appropriate, without departing from the scope of this disclosure. Moreover, this disclosure contemplates that many users may use one computer 602, or that one user may use multiple computers 602.

Described implementations of the subject matter can include one or more features, alone or in combination.

For example, in a first implementation, a computer-implemented method for determining velocity model for a subsurface structure includes generating, by at least one hardware processor, a first velocity model for the subsurface structure by performing a refraction traveltime tomography procedure based on an initial velocity model; and generating, by the at least one hardware processor, a first refined velocity model based on the first velocity model and a structure skeleton model, where the structure skeleton model is determined based on reflection seismic data of the subsurface structure The foregoing and other implementations can each, optionally, include one or more of the following features, alone or in combination:

A first aspect, combinable with the general implementation, where the first velocity model and the first refined velocity model are generated at a first iteration, the method further comprising: repeating the generations of the first velocity model and the first refined velocity model in a plurality of iterations until a stopping criterion is determined to be met, where at each iteration, the refined first velocity model generated at a previous iteration is used as the initial velocity model to generate the first velocity model at a current iteration.

A second aspect, combinable with any of the previous or following aspects, where the stopping criterion is determined to be met based on a comparison between the first velocity models generated at consecutive iterations.

A third aspect, combinable with any of the previous or following aspects, where generating the first refined velocity model comprises: converting the first velocity model into a first time domain velocity model; generating a first refined time domain velocity model based on the structure skeleton model; and converting the first refined time domain velocity model into a depth domain to generate the first refined velocity model.

A fourth aspect, combinable with any of the previous or following aspects, where generating the first refined velocity model comprises: dividing the subsurface structure into a plurality of regions based on the structure skeleton model; and for each region, replacing velocity values in the first velocity model with an average velocity value of a respective region.

A fifth aspect, combinable with any of the previous or following aspects, where performing the refraction traveltime tomography procedure comprises: calculating a weighting factor based on an angle between a ray segment and a vertical direction; and calculating a gradient based on the weighting factor.

A sixth aspect, combinable with any of the previous aspects, where the initial velocity model is a homogenous velocity model having a same velocity value throughout the subsurface structure.

In a second implementation, a non-transitory computer-readable medium storing instructions which, when executed, cause a computer to perform operations comprising: generating, by at least one hardware processor, a first velocity model for a subsurface structure by performing a refraction traveltime tomography procedure based on an initial velocity model; and generating, by the at least one hardware processor, a first refined velocity model based on the first velocity model and a structure skeleton model, wherein the structure skeleton model is determined based on reflection seismic data of the subsurface structure.

The foregoing and other implementations can each, optionally, include one or more of the following features, alone or in combination:

A first aspect, combinable with the general implementation, where the first velocity model and the first refined velocity model are generated at a first iteration, the operations further comprising: repeating the generations of the first velocity model and the first refined velocity model in a plurality of iterations until a stopping criterion is determined to be met, where at each iteration, the refined first velocity model generated at a previous iteration is used as the initial velocity model to generate the first velocity model at a current iteration.

A second aspect, combinable with any of the previous or following aspects, where the stopping criterion is determined to be met based on a comparison between the first velocity models generated at consecutive iterations.

A third aspect, combinable with any of the previous or following aspects, where generating the first refined velocity model comprises: converting the first velocity model into a first time domain velocity model; generating a first refined time domain velocity model based on the structure skeleton model; and converting the first refined time domain velocity model into a depth domain to generate the first refined velocity model.

A fourth aspect, combinable with any of the previous or following aspects, where generating the first refined velocity model comprises: dividing the subsurface structure into a plurality of regions based on the structure skeleton model; and for each region, replacing velocity values in the first velocity model with an average velocity value of a respective region.

A fifth aspect, combinable with any of the previous or following aspects, where performing the refraction traveltime tomography procedure comprises: calculating a weighting factor based on an angle between a ray segment and a vertical direction; and calculating a gradient based on the weighting factor.

A sixth aspect, combinable with any of the previous aspects, where the initial velocity model is a homogenous velocity model having a same velocity value throughout the subsurface structure.

In a third implementation, a device comprising: at least one hardware processor; and a non-transitory computer-readable storage medium coupled to the at least one hardware processor and storing programming instructions for execution by the at least one hardware processor, where the programming instructions, when executed, cause the at least one hardware processor to perform operations comprising: generating a first velocity model for a subsurface structure by performing a refraction traveltime tomography procedure based on an initial velocity model; and generating a first refined velocity model based on the first velocity model and a structure skeleton model, where the structure skeleton model is determined based on reflection seismic data of the subsurface structure.

The foregoing and other implementations can each, optionally, include one or more of the following features, alone or in combination:

A first aspect, combinable with the general implementation, where the first velocity model and the first refined velocity model are generated at a first iteration, the operations further comprising: repeating the generations of the first velocity model and the first refined velocity model in a plurality of iterations until a stopping criterion is determined to be met, where at each iteration, the refined first velocity model generated at a previous iteration is used as the initial velocity model to generate the first velocity model at a current iteration.

A second aspect, combinable with any of the previous or following aspects, where the stopping criterion is determined to be met based on a comparison between the first velocity models generated at consecutive iterations.

A third aspect, combinable with any of the previous or following aspects, where generating the first refined velocity model comprises: converting the first velocity model into a first time domain velocity model; generating a first refined time domain velocity model based on the structure skeleton model; and converting the first refined time domain velocity model into a depth domain to generate the first refined velocity model.

A fourth aspect, combinable with any of the previous or following aspects, where generating the first refined velocity model comprises: dividing the subsurface structure into a plurality of regions based on the structure skeleton model; and for each region, replacing velocity values in the first velocity model with an average velocity value of a respective region.

A fifth aspect, combinable with any of the previous or following aspects, where performing the refraction traveltime tomography procedure comprises: calculating a weighting factor based on an angle between a ray segment and a vertical direction; and calculating a gradient based on the weighting factor.

A sixth aspect, combinable with any of the previous aspects, where the initial velocity model is a homogenous velocity model having a same velocity value throughout the subsurface structure.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), a FPGA (field programmable gate array), or an ASIC (application-specific integrated circuit). In some implementations, the data processing apparatus or special purpose logic circuitry may be hardware-based or software-based. The apparatus can optionally include code that creates an execution environment for computer programs, for example, code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, or IOS.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, or libraries. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM), a random access memory (RAM), or both. The computer includes a CPU for performing or executing instructions. The computer also includes one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business or dynamic information, and any other appropriate information including any parameters, variables, algorithms, instructions, rules, constraints, or references. Additionally, the memory may include any other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity or a multi-touch screen using capacitive or electric sensing. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication, for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20, and all or a portion of the Internet. The network may communicate with, for example, Internet Protocol (IP) packets, Frame Relay frames, Asynchronous Transfer Mode (ATM) cells, voice, video, data, or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and software, may interface with each other or the interface using an application programming interface (API) or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API or service layer may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any disclosure or on the scope of what may be claimed, but rather as descriptions of features that may be specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation or integration of various system modules and components in the implementations described previously should not be understood as requiring such separation or integration in all implementations, and it should be understood that the described program components and systems can generally be integrated together in a single software product or packaged into multiple software products.

Accordingly, the previous description of example implementations does not define or constrain this disclosure. Other changes, substitutions, and alterations are also possible without departing from the spirit and scope of this disclosure.

What is claimed is:

1. A computer-implemented method for determining velocity model for a subsurface structure, comprising:
    generating, by at least one hardware processor, a first velocity model for the subsurface structure by performing a refraction traveltime tomography procedure based on an initial velocity model;
    generating, by the at least one hardware processor, a first refined velocity model based on the first velocity model and a time-domain structure skeleton model, wherein the time-domain structure skeleton model is determined based on reflection seismic data of the subsurface structure, and wherein the generating first refined velocity model based on the first velocity model and the time-domain structure skeleton model comprises:
        dividing the subsurface structure into a plurality of regions based on the time-domain structure skeleton model; and
        for each region that is divided based on the time-domain structure skeleton model, replacing velocity values in the first velocity model with an average velocity value of a respective region; and
    generating an image of the subsurface structure based on the first refined velocity model.

2. The method of claim 1, wherein the first velocity model and the first refined velocity model are generated at a first iteration, the method further comprising:
    repeating the generations of the first velocity model and the first refined velocity model in a plurality of iterations until a stopping criterion is determined to be met, wherein at each iteration, the refined first velocity model generated at a previous iteration is used as the initial velocity model to generate the first velocity model at a current iteration.

3. The method of claim 2, wherein the stopping criterion is determined to be met based on a comparison between the first velocity models generated at consecutive iterations.

4. The method of claim 1, wherein generating the first refined velocity model comprises:
    converting the first velocity model into a first time domain velocity model;
    generating a first refined time domain velocity model based on the time-domain structure skeleton model; and
    converting the first refined time domain velocity model into a depth domain to generate the first refined velocity model.

5. The method of claim 1, wherein performing the refraction traveltime tomography procedure comprises:
    calculating a weighting factor based on an angle between a ray segment and a vertical direction; and
    calculating a gradient based on the weighting factor.

6. The method of claim 1, wherein the initial velocity model is a homogenous velocity model having a same velocity value throughout the subsurface structure.

7. A non-transitory computer-readable medium storing instructions which, when executed, cause a computer to perform operations comprising:
    generating, by at least one hardware processor, a first velocity model for a subsurface structure by performing a refraction traveltime tomography procedure based on an initial velocity model;
    generating, by the at least one hardware processor, a first refined velocity model based on the first velocity model and a time-domain structure skeleton model, wherein the time-domain structure skeleton model is determined based on reflection seismic data of the subsurface structure, and wherein the generating first refined velocity model based on the first velocity model and the time-domain structure skeleton model comprises
        dividing the subsurface structure into a plurality of regions based on the time-domain structure skeleton model; and
        for each region that is divided based on the time-domain structure skeleton model, replacing velocity values in the first velocity model with an average velocity value of a respective region; and
    generating an image of the subsurface structure based on the first refined velocity model.

8. The non-transitory computer-readable medium of claim 7, wherein the first velocity model and the first refined velocity model are generated at a first iteration, the operations further comprising:
    repeating the generations of the first velocity model and the first refined velocity model in a plurality of iterations until a stopping criterion is determined to be met, wherein at each iteration, the refined first velocity model generated at a previous iteration is used as the initial velocity model to generate the first velocity model at a current iteration.

9. The non-transitory computer-readable medium of claim 8, wherein the stopping criterion is determined to be met based on a comparison between the first velocity models generated at consecutive iterations.

10. The non-transitory computer-readable medium of claim 7, wherein generating the first refined velocity model comprises:
    converting the first velocity model into a first time domain velocity model;
    generating a first refined time domain velocity model based on the time-domain structure skeleton model; and converting the first refined time domain velocity model into a depth domain to generate the first refined velocity model.

11. The non-transitory computer-readable medium of claim 7, wherein performing the refraction traveltime tomography procedure comprises:
calculating a weighting factor based on an angle between a ray segment and a vertical direction; and
calculating a gradient based on the weighting factor.

12. The non-transitory computer-readable medium of claim 7, wherein the initial velocity model is a homogenous velocity model having a same velocity value throughout the subsurface structure.

13. A device, comprising:
at least one hardware processor; and
a non-transitory computer-readable storage medium coupled to the at least one hardware processor and storing programming instructions for execution by the at least one hardware processor, wherein the programming instructions, when executed, cause the at least one hardware processor to perform operations comprising:
generating a first velocity model for a subsurface structure by performing a refraction traveltime tomography procedure based on an initial velocity model;
generating a first refined velocity model based on the first velocity model and a time-domain structure skeleton model, wherein the time-domain structure skeleton model is determined based on reflection seismic data of the subsurface structure, and wherein the generating first refined velocity model based on the first velocity model and the time-domain structure skeleton model comprises:
dividing the subsurface structure into a plurality of regions based on the time-domain structure skeleton model; and
for each region that is divided based on the time-domain structure skeleton model, replacing velocity values in the first velocity model with an average velocity value of a respective region; and
generating an image of the subsurface structure based on the first refined velocity model.

14. The device of claim 13, wherein the first velocity model and the first refined velocity model are generated at a first iteration, the operations further comprising:
repeating the generations of the first velocity model and the first refined velocity model in a plurality of iterations until a stopping criterion is determined to be met, wherein at each iteration, the refined first velocity model generated at a previous iteration is used as the initial velocity model to generate the first velocity model at a current iteration.

15. The device of claim 14, wherein the stopping criterion is determined to be met based on a comparison between the first velocity models generated at consecutive iterations.

16. The device of claim 13, wherein generating the first refined velocity model comprises:
converting the first velocity model into a first time domain velocity model;
generating a first refined time domain velocity model based on the time-domain structure skeleton model; and
converting the first refined time domain velocity model into a depth domain to generate the first refined velocity model.

17. The device of claim 13, wherein performing the refraction traveltime tomography procedure comprises:
calculating a weighting factor based on an angle between a ray segment and a vertical direction; and
calculating a gradient based on the weighting factor.

* * * * *

UNITED STATES PATENT AND TRADEMARK OFFICE
CERTIFICATE OF CORRECTION

Page 1 of 1

PATENT NO. : 10,948,617 B2
APPLICATION NO. : 15/837408
DATED : March 16, 2021
INVENTOR(S) : Qin et al.

It is certified that error appears in the above-identified patent and that said Letters Patent is hereby corrected as shown below:

On the Title Page

Item (54), Line 3, delete "TRAVEL TIME" and insert -- TRAVELTIME --;

In the Specification

Column 1, Line 3, delete "TRAVEL TIME" and insert -- TRAVELTIME --;

In the Claims

Column 17, Line 40, Claim 1, delete "time-domain" and insert -- time domain --;

Column 17, Line 45, Claim 1, delete "time-domain" and insert -- time domain --;

Column 17, Line 47, Claim 1, delete "time-domain" and insert -- time domain --;

Column 18, Line 34, Claim 7, delete "comprises" and insert -- comprises: --.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*